Sept. 12, 1950  J. W. BEAMS  2,521,891
VALVE
Filed March 28, 1944
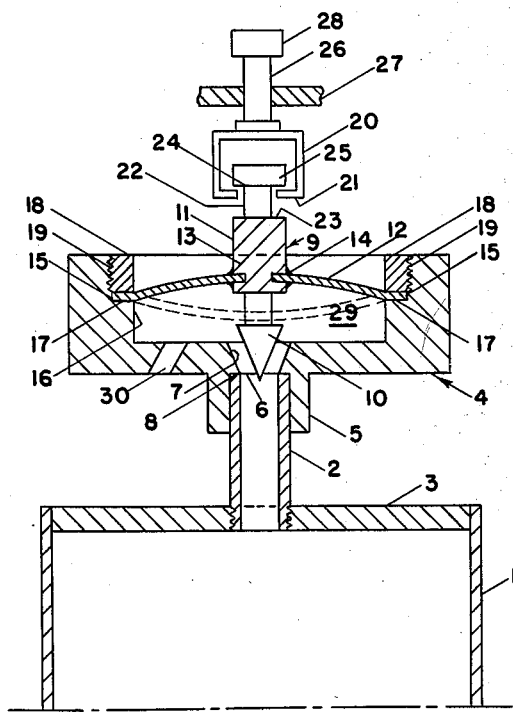
INVENTOR
J. W. BEAMS
BY—
ATTORNEY Patented Sept. 12, 1950

2,521,891

UNITED STATES PATENT OFFICE 2,521,891

VALVE

Jesse W. Beams, Charlottesville, Va., assignor to the United States of America as represented by the United States Atomic Energy Commission Application March 28, 1944, Serial No. 528,469

7 Claims. (Cl. 137—139)

This invention relates to valves and more particularly to valves for high speed centrifuges and like rotating devices.

In devices of this type it is quite often desirable to provide a valve or valves that may readily be opened and closed as required while the device is rotating at high speed. Conventional and other known types of valves are not suitable for this purpose since it is impossible to grasp and open or close them while the centrifuge, or other device with which they may be associated, is rotating.

The present invention contemplates a novel valve structure that may be opened or closed without regard to the speed of rotation of the device with which it is associated. To this end, a valve is provided in which the valve seat and valve plug are arranged coaxially of, and rotate with, the centrifuge or like device, and the valve plug is moved to and from open and closed position in a direction coaxially of the rotational axis of the centrifuge by forces likewise applied coincidentally with said rotational axis, with the result that opening and closing of the valve is not affected by rotation of the centrifuge.

Furthermore, it is desirable that the valves associated with rotating devices of the character mentioned be quick-acting and positive in operation and, particularly in the case of centrifuge devices, such valves should be vacuum tight when closed to preclude leakage of liquids and gases therethrough.

With the foregoing premises in mind, the principal object of the present invention is to provide a novel valve structure for centrifuges and like rotating devices that can readily be opened or closed as desired while such device is rotating at substantially high speed.

Another object of the invention is to provide, in conjunction with an ultra-high-speed centrifuge, a valve structure of the type set forth that is quick-acting, and spring-biased to both closed and open positions.

Another object of the invention is to provide a valve structure having the stated characteristics that is vacuum tight in closed position thereby making it proof against the leakage of fluids.

A further and more particular object of the invention is to provide, in conjunction with an ultra-high-speed centrifuge, a valve structure having the foregoing attributes wherein the valve plug is actuated to both closed and open positions by means of a spring diaphragm that operates in a positive manner to retain the valve plug in both its closed and open positions.

These and other objects of the invention, and the various features and details of the construction and operation thereof, are hereinafter more fully set forth and described, and shown in the accompanying drawing, in which the figure is a sectional elevation of a valve structure embodying the invention.

Referring to the drawing, the present invention is illustrated in conjunction with a centrifuge of the ultra-high-speed type comprising a rotatable separating chamber 1 having a hollow shaft 2 threaded in an end wall 3 thereof and arranged coaxially of the rotational axis of the chamber 1. The shaft 2 serves as an inlet or outlet for the material to be, or which has been, subjected to treatment in the chamber 1, and another shaft (not shown), similar in arrangement and function, is provided at the other or lower end of said chamber, the said chamber and shafts being rotationally driven about their common axes by any suitable power source, such as a turbine, electric motor or the like, at the speed required for proper treatment of the particular material.

As previously stated, it is quite often necessary to provide a suitable valve structure that may readily be opened or closed during rotation of the centrifuge to control the flow of material to or from the chamber 1 through the shaft 2. To this end, therefore, and in accordance with one embodiment of the present invention, there is fixedly secured upon the upper or outer end of the shaft 2, for rotation therewith, a valve casing 4. This valve casing 4 is of circular, generally cup-shaped configuration, and is provided with a central hub portion 5 to receive the end portion of the shaft 2, said hub portion 5 being fixedly secured to said shaft 2 in any suitable manner such as, for example, by welding, soldering, brazing, or the like.

Formed centrally in the valve casing 4 and in axial alignment with the bore of the shaft 2 is a port 6, the defining wall portions of which provide a valve seat 7 and, as shown in the drawing, the hub portion 5 of the valve casing is provided with an internal annular shoulder 8 of a width substantially equal to the wall thickness of the shaft 2 so that the diameter or flow area of the valve port 6 adjacent the outer end of the shaft 2 is substantially equal to the diameter or flow area of said shaft.

Opening and closing of the valve port 6 is accomplished by means of a valve closure 9 having a plug portion 10 and a stem portion 11. In the form of the invention illustrated in the drawing, the valve seat 7 and plug portion 10 are of tapered or generally conical configuration to provide a large area of surface contact therebetween and, while this construction is preferred for the reason set forth, it is not essential to efficient and satisfactory operation of the valve and therefore is not to be considered as a limitation upon the invention.

In accordance with the invention, the valve closure 9 is arranged coaxially with respect to the rotational axis of the centrifuge and its shaft 2, and opening and closing of the valve port 6 is accomplished by movement of said closure 9 along that axis to engage or disengage the plug portion 10 thereof with respect to the valve seat 7 in a manner that will be clear from an inspection of the drawing.

The valve closure is biased to, and held in a positive manner in, both closed and open relation with respect to the valve seat 7 by means of a flexible resilient diaphragm 12 of circular or disk-like configuration which is adapted to be flexed or snapped in a manner hereinafter described, into one or the other of the two positions shown in full and dotted lines, respectively, in the drawing. This diaphragm 12 has an opening centrally therein and is secured in a groove 13, formed circumferentially of the valve stem 11, by any suitable means such as, for example, soldering, welding, or the like, as indicated at 14.

Preferably the diaphragm is composed of suitable spring metal material—for example, silicon steel—and may be fabricated by hammering a flat metal disk of such metal into the generally concave-convex form illustrated. Also, for the purpose of strengthening the diaphragm 12 and preserving the positive force of its snap action over substantial periods of use, the peripheral edge portion of the diaphragm may be subjected to a spinning action to provide a flat circumferential edge portion 15, which extends outwardly and lies in a plane perpendicular to the direction of flexure of the diaphragm. This construction also serves to insure that the bias and positive holding action of the diaphragm will be the same in both flexed positions thereof shown in full and dotted lines, respectively, in the drawing.

The internal wall 16 of the valve casing 4 is provided with an annular shoulder 17 which serves as a seat for the flat peripheral edge 15 of the diaphragm 12, and the latter is secured upon said seat 17 by means of a ring 18 threaded internally of said valve casing 4, as indicated at 19. The spacing of the seat or shoulder 17 axially with respect to the valve port 6 is critical and, of course, must be accurately determined in order that the valve plug 10 will be held tightly upon the valve seat 7 by the diaphragm 12 when the latter is flexed or snapped into the dotted line position shown in the drawing.

As previously stated, the valve casing 4 rotates with the shaft 2 and chamber 1, and, since the diaphragm 12 and valve closure 9 are fixedly secured with respect to each other and to said casing, it will be obvious that the diaphragm 12 and closure 9 rotate with the centrifuge, together with the valve casing 4, as a unit.

Devices such as those here involved generally are operated at substantially high speeds of rotation, and actuation of the similarly rotating valve structure to flex or snap the diaphragm and close or open the valve port 6 presents a substantial problem. According to the present invention this may be effectively accomplished by providing a non-rotating, axially slidable yoke member 20 having inwardly directed flange portions 21 that project inwardly of the valve stem portion 22 of reduced diameter and are movable relative to the valve stem, axially thereof, between spaced stops 23, 24 formed respectively by the adjacent end faces of the larger stem portion 11 and stem head portion 25. Actuation of the yoke member 20 axially of the valve closure and shaft 2 may be accomplished by means of a suitable push rod 26 slidably supported in a bearing 27 and provided on its outer or free end with a handle 28.

From the foregoing description it will be observed that the valve casing 4 and the diaphragm 12 that is secured therein, cooperate to form a fluid chamber 29 within the casing 4 and below the diaphragm. Thus, when the valve closure 9 is open with respect to the valve seat 7, this chamber 29 is in open communication with the interior of the chamber 1 through the shaft 2, and one or more ports 30 may be provided in the valve casing 4 through which fluid materials may be admitted to, or withdrawn from, said chamber 29 and the centrifuge chamber 1.

Thus in operation, and with the valve closure 9 in the open position shown in the drawing, one or more fluids may be introduced into the centrifuge chamber 1 through the ports 30 to the interior of the valve casing chamber 29, from which they flow through the valve port 6 and shaft 2 into said chamber— the withdrawal of a fluid or fluids from the chamber following the same course but in reverse direction and order. On the other hand, when the diaphragm 12 is flexed or snapped over its center line position into the dotted line position illustrated, the valve plug 10 is firmly held upon its seat 7, thereby closing the port 6 and precluding the flow of fluids both to and from the chamber 1.

It will be apparent from the foregoing description and the accompanying drawing that the present invention provides a novel valve structure for rotating devices, such as centrifuges, separators and the like, that may be closed or opened, as the case may require, with facility and without regard to the speed at which the device may be rotating.

The diaphragm 12, fabricated of spring metal in the manner previously described herein, when properly clamped or secured in the valve casing 4, is biased to the solid line position shown in the drawing and exerts a positive action or force upwardly thereby holding the valve closure 9 in open or raised position with respect to its seat 7. Similarly, if the diaphragm 12 is flexed downwardly to a point below the centerline or plane of its edge portion 15 by appropriate pressure applied to the push rod 26, the diaphragm will snap into the dotted line position shown in the drawing carrying with it the closure 9, thereby engaging the plug 10 thereof with the valve seat 7 and exerting a continuous force or bias in the direction of the said seat 7 that operates in a positive manner to hold the valve tightly closed against leakage.

The invention thus provides a quick-acting valve, characterized by its spring biased positive operation to both closed and open positions, that may be closed or opened as desired without regard to the speed of rotation of the device with which associated. The invention also provides a valve that is vacuum-tight when closed, thereby rendering it entirely practical for use in controlling the flow of gases and liquids.

It will be obvious, of course, that a valve embodying the invention may be employed generally and effectively to control the flow of substances to and from rotating members and is not necessarily limited to use with centrifuges and like devices. Similarly, while a particular embodiment of the invention has been illustrated and described herein, it is to be understood that practical embodiments of the invention are not limited to the present disclosure, but that changes and modifications may be made and incorporated within the scope of the claims.

I claim:

1. A valve for controlling flow to and from a rotating member through a port having its axis coincident with the rotational axis of said member, comprising a closure for said port rotatable with the member and movable axially thereof between closed and open positions with respect to said port, non-rotating axially movable means for actuating said closure to said closed and open positions, and a resilient diaphragm connected to said closure and rotatable with said member arranged to be flexed by actuation of the closure between positions at respectively opposite sides of a center corresponding to closed and open positions of the closure, the construction and arrangement of said diaphragm being such that the closure is biased and positively held thereby in both its closed and open positions.

2. A valve for controlling flow to and from a rotating member through a port having its axis coincident with the rotational axis of said member, comprising a closure for said port rotatable with the member and movable axially thereof into closed and open positions with respect to said port, means for actuating said closure between open and closed positions, and a resilient diaphragm sealed with respect to said member and said closure arranged to be flexed by said closure between positions at respectively opposite sides of a center corresponding to the closed and open positions of the closure and operable to bias and positively hold said closure in both its closed and open positions.

3. In combination with a rotating member provided with a port having its axis coincident with the rotational axis of the member, a valve for controlling flow through said port comprising a valve casing rotatable with said member and having a valve port therein in alignment with the port of the rotating member, a closure for said valve port rotatable with said casing, means for actuating said closure between closed and open positions with respect to said valve port, and a cupped resilient diaphragm sealingly connected to said closure and having its outer edge portion secured in and sealed with respect to said valve casing, said diaphragm being flexible by movement of said closure between positions at respectively opposite sides of a center corresponding to the closed and open positions of the closure and operating to bias and positively hold said closure in both its closed and open positions.

4. A valve for controlling flow to and from a rotating member through a port having its axis coincident with the rotational axis of the member, comprising a valve casing rotatable with said member and having a valve port therein in alignment with the port of the rotational member, a closure for said valve port rotatable with said casing, non-rotating means movable coaxially of the closure for actuating the same between closed and open positions with respect to said valve port, and a resilient diaphragm having a central cupped portion sealingly connected to said closure and a flat outer edge portion sealingly secured in said valve casing, said diaphragm being flexed by movement of said closure between positions at respectively opposite sides of a center corresponding to the closed and open positions of the closure and operating to bias and positively hold said closure in both its closed and open positions.

5. A valve for controlling flow to and from a rotating member through a port having its axis coincident with the rotational axis of the member, comprising a valve casing rotatable with said member and having a valve port therein aligned with the port of the rotating member, a closure for said port rotatable with said casing and movable axially thereof between closed and open positions with respect to said valve port, said closure having axially spaced stops thereon, non-rotating means movable coaxially of the closure and cooperable with said stops to actuate said closure to said closed and open positions, and resilient means flexible by movement of the closure between positions at respectively opposite sides of a center corresponding to the closed and open positions of said closure and operating to bias and positively hold the closure in both its closed and open positions.

6. In combination with a rotating member provided with a port having its axis coincident with the rotational axis of the member, a valve for controlling flow through said port comprising a valve casing rotatable with said member and having a valve port therein in alignment with the port of the rotating member, a closure for said valve port rotatable with said casing, means for actuating said closure between closed and open positions with respect to said valve port, a resilient diaphragm sealingly connected to said closure and having its outer edge portion sealingly secured in said valve casing, said diaphragm forming with said casing a sealed fluid chamber therein adjacent the valve port and being flexible by movement of said closure between positions at respectively opposite sides of a center corresponding to the closed and open positions of the closure to thereby bias and positively hold said closure in both its closed and open positions, and said casing having a port therein for introducing and withdrawing fluid materials to and from said chamber.

7. A valve for controlling flow to and from a rotating member through a port having its axis coincident with the rotational axis of the member, comprising a valve casing rotatable with said member and having a valve port therein aligned with the port of the rotating member, a closure for said port rotatable with said casing and movable axially thereof between closed and open positions with respect to said valve port, said closure having axially spaced stops thereon, a non-rotating member movable coaxially of the closure and cooperable with said stops to actuate said closure to said closed and open positions, a resilient diaphragm having a cupped central portion sealingly connected to said closure and having a flat outer edge portion sealingly secured in said valve casing, said diaphragm forming with said casing a sealed fluid chamber therein adjacent the valve port and being flexible by movement of the closure between positions at respectively opposite sides of a center corresponding to the closed and open positions of said closure to bias and positively hold the closure in both its closed and open positions, and means for actuating said non-rotating member coaxially with respect to said closure.

JESSE W. BEAMS.

REFERENCES CITED

The following references are of record in the file of this patent:

UNITED STATES PATENTS

| Number | Name | Date |
|---|---|---|
| 745,696 | Van Kirk | Dec. 1, 1903 |
| 901,056 | Atkins | Oct. 13, 1908 |
| 1,603,005 | Flam | Oct. 12, 1926 |
| 1,719,687 | Browne | July 2, 1929 |
| 1,861,046 | Bower | May 31, 1932 |
| 1,865,219 | Spencer | June 28, 1932 |
| 2,070,421 | Chisholm | Feb. 9, 1937 |
| 2,242,184 | Reuter | May 13, 1941 |